US008635331B2

(12) United States Patent
Araujo, Jr. et al.

(10) Patent No.: US 8,635,331 B2
(45) Date of Patent: Jan. 21, 2014

(54) DISTRIBUTED WORKFLOW FRAMEWORK

(75) Inventors: Nelson Sampaio Araujo, Jr., Redmond, WA (US); Roger S. Barga, Bellevue, WA (US); Jared J. Jackson, Sammamish, WA (US); Di Guo, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 474 days.

(21) Appl. No.: 12/535,698

(22) Filed: Aug. 5, 2009

(65) Prior Publication Data

US 2011/0035506 A1 Feb. 10, 2011

(51) Int. Cl.
*G06F 15/173* (2006.01)

(52) U.S. Cl.
USPC ............ 709/224; 709/203; 709/231; 709/246

(58) Field of Classification Search
USPC .................................. 709/203, 224, 231, 246
See application file for complete search history.

(56) References Cited

U.S. PATENT DOCUMENTS

| | | | |
|---|---|---|---|
| 6,412,010 B1 | 6/2002 | Kind | |
| 6,826,579 B1 * | 11/2004 | Leymann et al. | 717/131 |
| 6,928,488 B1 | 8/2005 | De Jong et al. | |
| 6,941,561 B1 | 9/2005 | Kasichainula et al. | |
| 7,299,244 B2 * | 11/2007 | Hertling et al. | 707/694 |
| 7,325,226 B2 | 1/2008 | Pepin et al. | |
| 7,451,432 B2 * | 11/2008 | Shukla et al. | 717/106 |
| 7,464,366 B2 * | 12/2008 | Shukla et al. | 717/100 |
| 7,644,125 B2 * | 1/2010 | Baynes et al. | 709/206 |
| 7,676,472 B2 * | 3/2010 | Kurhekar et al. | 707/999.01 |
| 7,716,360 B2 * | 5/2010 | Angelov | 709/231 |
| 7,861,251 B2 * | 12/2010 | Harvey et al. | 719/316 |
| 7,996,434 B2 * | 8/2011 | Palanisamy et al. | 707/796 |
| 2008/0126543 A1 * | 5/2008 | Hamada et al. | 709/225 |
| 2008/0282318 A1 * | 11/2008 | Rits | 726/1 |

OTHER PUBLICATIONS

"Overview of .NET Remoting", TechBubbles, Retrieved at <<http://www.techbubbles.com/tag/net-remoting/>>, Aug. 21, 2008, pp. 1-6.
Henry, Kevin, Objective Viewpoint, "Distributed Computation with Java Remote Method Invocation", Tutorials—6.5, Mid Summer 2000, Retrieved at <<http://www.acm.org/crossroads/xrds6-5/ovp65.html>>, vol. 6, Issue 5, 2000, pp. 1-6.
Rammer, Ingo, "From .NET Remoting to the Windows Communication Foundation (WCF)", Visual Studio 2005 Technical Articles, Retrieved at <<http://msdn.microsoft.com/en-us/library/aa730857(VS.80).aspx>>, 2005, pp. 1-16.
Hanson, Jeff, "Implement Java-based Distributed Computing with RMI", Retrieved at <<http://articles.techrepublic.com.com/5100-10878_11-5035183.html>>, Jun. 30, 2003, pp. 1-4.
"Java Distributed Object Model", Retrieved at <<http://v1.dione.zcu.cz/java/docs/jdk1.1/docs/guide/rmi/spec/rmi-objmodel.doc.html#357>>, Jul. 3, 2009, pp. 1-7.
Mikhaelenko, Peter V., "Understand When to Serialize v. Externalize Objects in Java", Retrieved at <<http://articles.techrepublic.com.com/5100-10878_11-6159276.html>>, Feb. 14, 2007, pp. 1-3.

* cited by examiner

*Primary Examiner* — Rupal Dharia
*Assistant Examiner* — Van Kim T Nguyen

(57) ABSTRACT

Aspects of the subject matter described herein relate to workflows. In aspects, an activity of a workflow may request data and provide a logical handle. In response, distributed workflow components use the logical handle to determine whether the requested data is available locally or remotely. If the data is available remotely, the components may obtain the data for the requesting entity. In the process of obtaining the data, the data may be serialized and deserialized. After the data is available locally, it is provided to the requesting entity.

17 Claims, 5 Drawing Sheets

DISTRIBUTED WORKFLOW FRAMEWORK

BACKGROUND

In an attempt to speed up processes, software developers have often tried to distribute the processes on multiple physical machines. For simple problems, there are some well known solutions for distributing computation among multiple machines for some programming problems.

For example, in searching a key space for a cryptographic key, each machine that is involved in the searching may be assigned one or more ranges within the key space. After a machine has been assigned a range, the machine may search the range for the key without additional interaction. After the machine has searched the space or found the key, the machine may communicate its results to a machine that is reporting on the results. Even with this relatively simple programming problem, however, effort is needed to determine how the problem will be divided between the available machines, coding the software with a distributed model in mind, and determining how to minimize communications between machines.

Because of communication latency and other overhead associated with distributed computing, processes that are distributed across multiple machines may actually take longer than if the processes were not distributed. Because of the complexities of distributing processes across multiple machines, it is often avoided or used only as a last resort.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to workflows. In aspects, an activity of a workflow may request data and provide a logical handle. In response, distributed workflow components use the logical handle to determine whether the requested data is available locally or remotely. If the data is available remotely, the components may obtain the data for the requesting entity. In the process of obtaining the data, the data may be serialized and deserialized. After the data is available locally, it is provided to the requesting entity.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment." Other definitions, explicit and implicit, may be included below.

Exemplary Operating Environment

Figure 1:
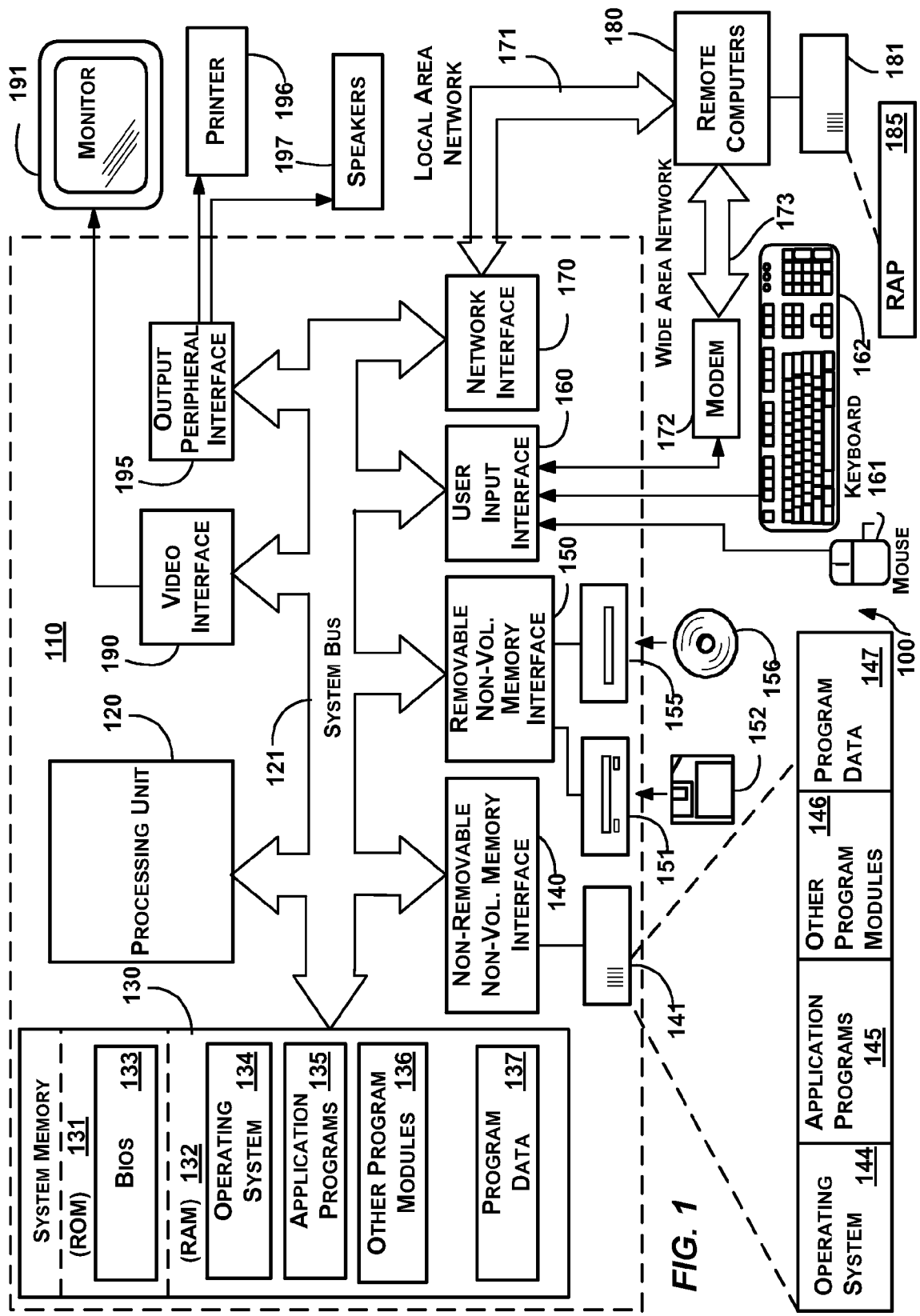
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data are given different numbers herein to illustrate that, at a minimum, they are different copies.

A user may enter commands and information into the computer 20 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Distributed Processing

As mentioned previously, distributing processes among multiple machines is complex and may result in performance degradation. Processes may be involved in performing the work of a workflow. A workflow indicates a sequence of units of work to perform. A unit of work is sometimes referred to as an "activity" herein. An activity may receive input and produce output. As long an activity has its appropriate input, it may not matter where the activity is performed.

In a workflow, output from one or more activities may be passed as inputs to one or more other activities. In passing data from one activity to another activity, the data may be transferred to another machine.

A workflow may potentially be distributed across a plurality of nodes. A workflow may be associated with a registry that includes location information about the nodes from which data associated with the workflow is obtainable. Additional details regarding workflows are provided below.

Figure 2:
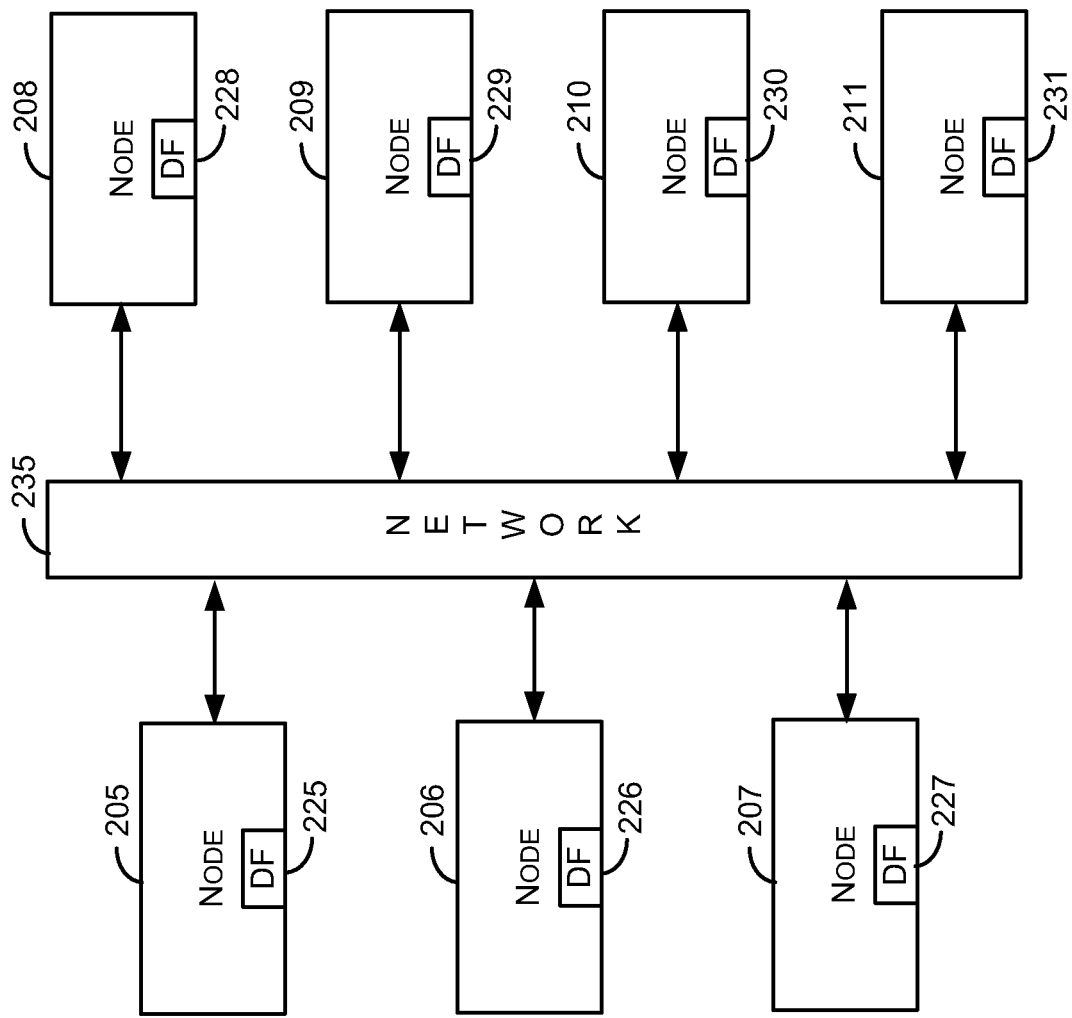
FIG. 2 is a block diagram representing an exemplary environment in which aspects of the subject matter described herein may be implemented.

FIG. 2 is a block diagram representing an exemplary environment in which aspects of the subject matter described herein may be implemented. The environment may include various nodes 205-211, a network 235, and may include other entities (not shown). The nodes 205-211 may include distributed framework components 225-231. The various entities may be located relatively close to each other or may be distributed across the world. The various entities may communicate with each other via various networks including intra- and inter-office networks and the network 235.

In an embodiment, the network 235 may comprise the Internet. In an embodiment, the network 235 may comprise one or more local area networks, wide area networks, direct connections, virtual connections, private networks, virtual private networks, some combination of the above, and the like.

Each of the nodes 205-211 may comprise or reside on one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to act as a node comprises the computer 110 of FIG. 1.

In transferring data from one activity to another, one or more distributed framework components may be utilized. In particular, the distributed framework components may comprise various components such as those illustrated in FIG. 3. These components are able to obtain requested data when the data is needed. The distributed framework components may be accessed when a process that is performing the activity requests input data. At this point, the distributed framework components may determine whether the requested data is located on the local machine or whether it resides on a remote machine. If the data resides on a remote machine, the distributed framework components may then request the data and store it locally. The distributed framework components may then return the requested data to the requesting process. After the data has been used, the distributed framework components may discard it in accordance with a policy, configuration, or otherwise.

The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

To transfer data from one machine to another, the data may be serialized into a byte stream by the sending machine and sent over a connection to the target machine. Serialization may involve encoding data structures, executable code, program state, and other information in the byte stream. In conjunction with receiving the byte stream, the target machine may deserialize the data. Deserializing the data may include installing executable code on the target machine, constructing and populating data structures, setting program state, or the like.

To request data via a distributed framework component, a process may pass a logical handle to the component. A logical handle may comprise an identifier (e.g., a sequence of bits) that identifies the requested data. In one embodiment, this logical handle may be used to locate a binding that indicates where the requested data may be found. In one embodiment, the binding may be hard coded.

In another embodiment, this logical handle may be used to access additional data regarding one or more workflows. This data may be stored completely or partially in a registry. As used herein, the term registry means a collection of data. The registry may include information that indicates where (e.g., on what nodes) the data resides. The registry may associate logical handles with their physical resolutions. The registry may be used to track the state of workflows, activities within workflows, output data from activities, the nodes involved in a workflow, and other information about workflows from the time the workflows are created to the time the workflows are terminated.

The registry may be stored in a single location, multiple locations, or may be distributed across multiple devices. The registry may reference a set of data that is read-only to the registry or a set of data that is read/write to the registry.

Data stored in the registry may be organized in tables, records, objects, other data structures, and the like. The data may be stored in HTML files, XML files, spreadsheets, flat files, document files, configuration files, and other files. The registry may comprise a relational database, object-oriented database, hierarchical database, network database, other type of database, some combination or extension of the above, and the like.

When the registry is not maintained in a database, the registry may be accessed by one or more distributed framework components via one or more protocols that include, for example, Transmission Control Protocol (TCP), Hypertext Transport Protocol (HTTP), SOAP, Remote Procedure Call (RPC) protocols, file and memory protocols, and the like.

When the registry is organized as a database, the registry may be accessed via a database management system (DBMS). A DBMS may comprise one or more programs that control organization, storage, management, and retrieval of data of a database. A DBMS may receive requests to access data in the registry and may perform the operations needed to provide this access. Access as used herein may include reading data, writing data, deleting data, updating data, a combination including two or more of the above, and the like.

In describing aspects of the subject matter described herein, for simplicity, terminology associated with relational databases is sometimes used herein. Although relational database terminology is sometimes used herein, the teachings herein may also be applied to other types of databases including those that have been mentioned previously.

As used herein, a record is to be read broadly as to include a set of related data. For example, in a relational database, a record may comprise a row of a table. In data that is outside of a database, a record may comprise data of one or more activities of a workflow.

When a process provides a logical handle to access data, the logical handle may be used in conjunction with the registry to determine where the data resides. For example, the logical handle may be used to find one or more records in the registry that include information regarding data associated with a workflow.

A record in the registry may include address information that indicates the node or nodes upon which the requested data resides. A record may also include additional information including, for example, version data, creation data, validation data, security data, policy data, tags, provenance data, one or more process identifiers, entity (or entities) that are executing the workflow, other information, and the like.

Version data may indicate a version of the data that is associated with the logical handle. If more than one version exists, the version data may be used to obtain the data of the appropriate version.

Creation data may indicate an entity that created or caused the data to be stored on or by a node. Creation data may include, for example, a user identifier, group identifier, machine identifier, workflow identifier, some other identifier, or the like.

Validation data may indicate an entity that validated the data. Validation data may include one or more identifiers of the types indicated above for the creation data.

Security data may include any data needed to securely transmit data between nodes as well as any data needed to determine whether a requesting entity is to be given access to the data. For example, in conjunction with starting an activity, distributed framework components may determine where data that might potentially be needed for the activity resides. If the data resides on remote nodes, in one embodiment, the distributed framework components may set up secure communication channels (sometimes called "sessions") with the remote nodes, generate and associate tickets with the sessions where the tickets may be presented in conjunction with requesting data, and may store security information regarding the sessions in the registry. In an embodiment, information regarding the entities that may use the sessions to access data may also be stored in the registry to avoid a potential security breach. This information may include one or more process identifiers, machine identifiers, group identifiers, user identifiers, and the like.

Based on the teachings herein, those skilled in the art may recognize many other security mechanisms that may be used to ensure that only authorized entities are allowed to access data regarding a workflow. If such a mechanism is used, security data associated with the mechanism may be stored in the registry to facilitate the security mechanism. For example, when an entity requests data associated with a handle, the handle may be used to access the security information in the registry which may then be used to determine whether the entity is allowed to access the requested data. If the entity is allowed to access the requested data, additional security information (e.g., a ticket stored in the registry) may be used to obtain access to a session with a node that has the requested data.

Although security data and security mechanisms are described herein, there is no intention to limit aspects of the subject matter described herein to just those that have security mechanisms. Indeed, in one embodiment, the distributed framework components may not be responsible for and may store no data regarding security mechanisms for passing data between activities.

Policy data may indicate how and when data is obtained from a remote node. For example, policy data may indicate that when any data of a file is requested, that just the requested data from the file be downloaded, that a portion of the file be downloaded from the remote node, or that the entire file be downloaded from the remote node. Policy data may indicate that data that may potentially be needed for input to an activity be downloaded before the activity is started.

The policy may depend on the type of file that includes the requested data. For example, when data in a spreadsheet is requested, the entire file that includes the spreadsheet may be obtained from the remote node. As another example, when data in an audio file is requested, a portion of the audio file may be obtained from the remote node.

Policy data may be influenced or overridden by tags. A developer, user, system administrator, or the like (hereinafter sometimes simply referred to as a "developer") may tag certain data to indicate when and how to obtain the data, when needed, from a remote node. For example, a developer may tag certain data as data that is always needed before the execution of an activity. When data is tagged in this manner, the distributed framework components may ensure that the data is fetched prior to starting an activity.

As another example, a developer may tag other data as data that may be brought over upon demand. When data is tagged in this manner, the distributed framework components may wait until the data is requested before bringing the data over.

Provenance data may indicate the activity or activities that executed to create the data as well as the sequence of the activities when more than one activity has been involved in creating the data. Provenance data may be used, if needed, to regenerate data by re-executing various activities.

Process identifiers in the registry may identify processes that are allowed to access the data, processes that are involved in activities, other processes, and the like. Process identifiers may be included as part of the security data described above.

In one embodiment, data may be secured via user credentials. In another embodiment, access to data may be granted or denied based on the process requesting the data—regardless of the user executing the process. For example, if a request comes from a site considered to be secure (e.g., https://paystub), the requesting process may be allowed to get data to do the processing (e.g., from an HR database) regardless of the user that is requesting access from the secure site.

The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or a single device.

The distributed framework components may determine when transferred data is to be deleted or otherwise made inaccessible from a target machine. The registry may include explicit developer-specified information regarding when the transferred data is to be deleted, policies that may be applied to determine when transferred data is to be deleted, other data regarding deletion, a combination of two or more of the above, and the like.

With the data about workflows described above, the distributed workflow components may automatically distribute a workflow that executes on a single node to a workflow that executes on multiple nodes. In distributing a workflow, the distributed workflow components may use many factors including workflow needs, node capabilities, user hints, policies, rules, other factors, and the like.

Activities of distributed workflows may be connected together through one or more of the distributed workflow components. In distributing activities of a workflow, the activities may be "stitched" together via distributed workflow components that reside on the nodes of the workflow.

With a logical handle, an activity does not need to know where the data it needs resides. Rather, the activity may present the logical handle to a distributed workflow component. The distributed workflow component may then use the handle to determine whether some or all of the data resides remotely or locally. If any data resides remotely, the component may contact a distributed workflow component on the remote node to obtain the data.

Where a distributed workflow exists, the distributed workflow components may redistribute the activities of the workflow based on the factors mentioned above. For example, if a developer has the workflow running distributed across nodes of a development environment, the distributed framework components may select different nodes to execute various activities of the workflow in an actual runtime environment.

Although the environment described above includes various numbers of the entities and related infrastructure, it will be recognized that more, fewer, or a different combination of these entities and others may be employed without departing from the spirit or scope of aspects of the subject matter described herein. Furthermore, the entities and communication networks included in the environment may be configured in a variety of ways as will be understood by those skilled in the art without departing from the spirit or scope of aspects of the subject matter described herein.

Figure 3:
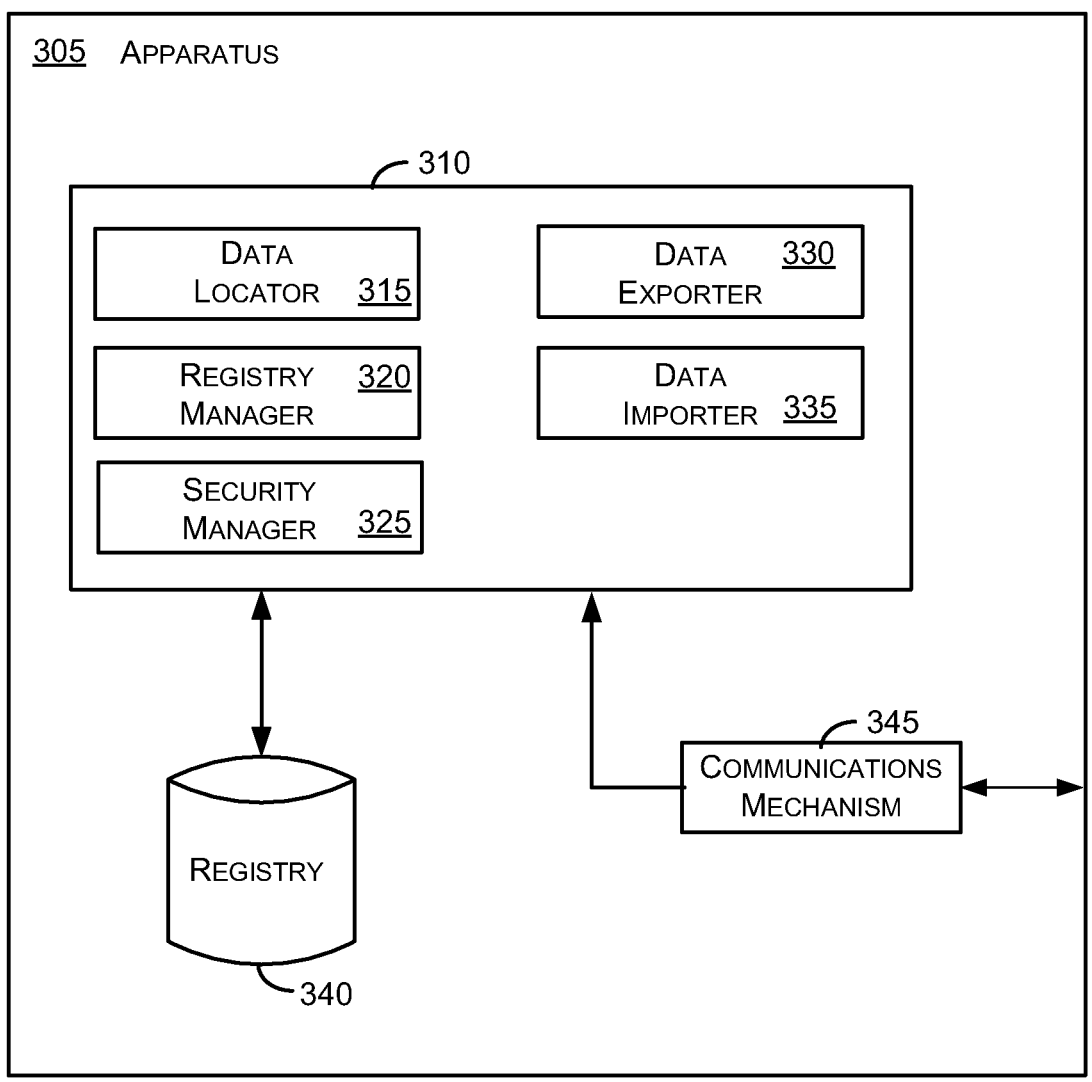
FIG. 3 is a block diagram that represents an apparatus configured in accordance with aspects of the subject matter described herein.

FIG. 3 is a block diagram that represents an apparatus configured in accordance with aspects of the subject matter described herein. The components illustrated in FIG. 3 are exemplary and are not meant to be all-inclusive of components that may be needed or included. In other embodiments, the components and/or functions described in conjunction with FIG. 3 may be included in other components (shown or not shown) or placed in subcomponents without departing from the spirit or scope of aspects of the subject matter described herein. In some embodiments, the components and/or functions described in conjunction with FIG. 3 may be distributed across multiple devices.

Turning to FIG. 3, the apparatus 305 may include distributed framework components 310, a store 340, a communications mechanism 345, and other components (not shown). The apparatus 305 corresponds to any of the nodes 205-211 of FIG. 2 and may be implemented on or as the same or similar device(s) upon which one of the nodes 205-211 may be implemented. For example, the apparatus 305 may be implemented on or as a computer (e.g., as the computer 110 of FIG. 1).

The distributed framework components 310 correspond to the distributed framework components 225-231 found on the nodes 205-211 of FIG. 2. The distributed framework components 310 may include a data locator 315, a registry manager 320, a security manager 325, a data exporter 330, a data importer 335, and other components (not shown).

The communications mechanism 345 allows the apparatus 305 to communicate with other entities. For example, if the apparatus 305 comprises the node 208, the communications mechanism 345 allows the apparatus to communicate with the nodes 205-207, 208-211, and other entities reachable via the network 235. The communications mechanism 345 may be a network interface or adapter 170, modem 172, or any other mechanism for establishing communications as described in conjunction with FIG. 1.

The store 340 is any storage media capable of storing data and may provide access to data of a registry, data needed for or produced by activities, data needed for program execution and state, and the like. The store 340 may comprise a file system, database, volatile memory such as RAM, other storage, some combination of the above, and the like and may be distributed across multiple devices. The store 340 may be external, internal, or include components that are both internal and external to the apparatus 305.

The data locator 315 is operable to access the registry information (e.g., via the registry manager) to determine a whether requested data is available locally or remotely. Requested data is available locally if the data resides on one or more storage media of the apparatus. Storage media of the apparatus may but does not need to physically reside on the apparatus and can reside on a device attached to a network. Requested data is stored locally if the data may be obtained from a local hard drive or from a file server to which the node already has access, without establishing a file share or other network share to obtain the data. Requested data may also be considered to be available locally if an activity that can execute locally can generate the requested data from data that resides on one or more storage media of the apparatus. Data reside remotely if the data exists or can be created via an activity of the workflow and where the data is not available locally.

The registry manager 320 may provide access to registry information included in the store 340. The registry manager 320 may further operate to receive a logical handle and to return one or more records from the registry information based on the logical handle. The registry manager 320 may comprise a component that other components may call to access the registry information. As used herein, the term component is to be read to include all or a portion of a device, a collection of one or more software modules, some combination of one or more software modules and one or more devices, and the like.

The security manager 325 is operable to access registry information (e.g., via the registry manager 320) to obtain security information therefrom. The security manager 325 may be further operable to enforce security (e.g., allow and deny requests and establish secure connections) with respect to the requested data in accordance with the security information.

The data exporter 330 is operable to obtain one or more of executable code, program state, and other data related to a request for data, to serialize the one or more of executable code, program state, and other data into a byte stream, and to send the byte stream to a requesting entity.

The data importer 335 operable to obtain the data from a remote node if the data resides remotely. The data importer may be further operable to to deserialize the data and construct a data structure from the data on a storage media of the apparatus after obtaining the data from the remote node.

Figure 4:
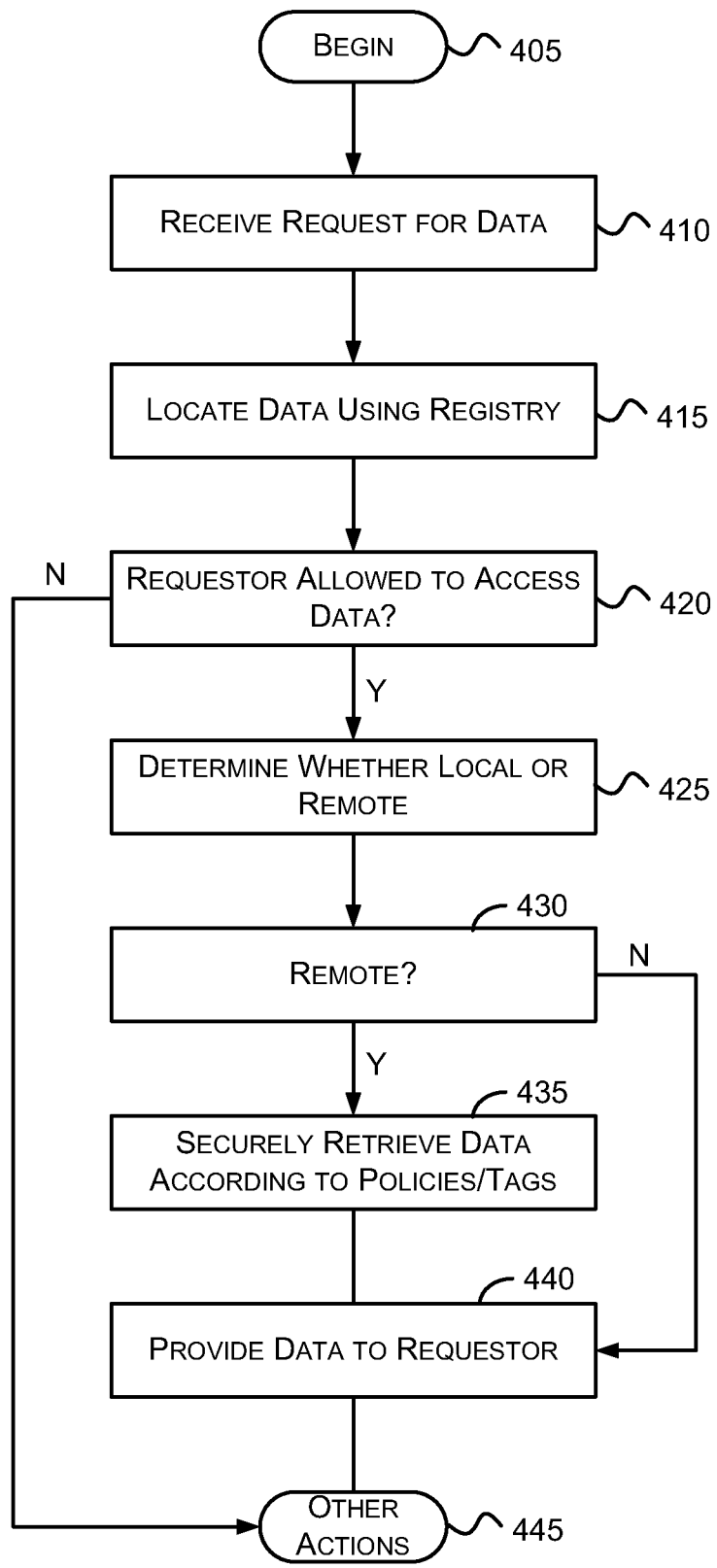
FIG. 4 is a flow diagram that generally represents exemplary actions that may occur on a node that is requesting data in accordance with aspects of the subject matter described herein.
Figure 5:
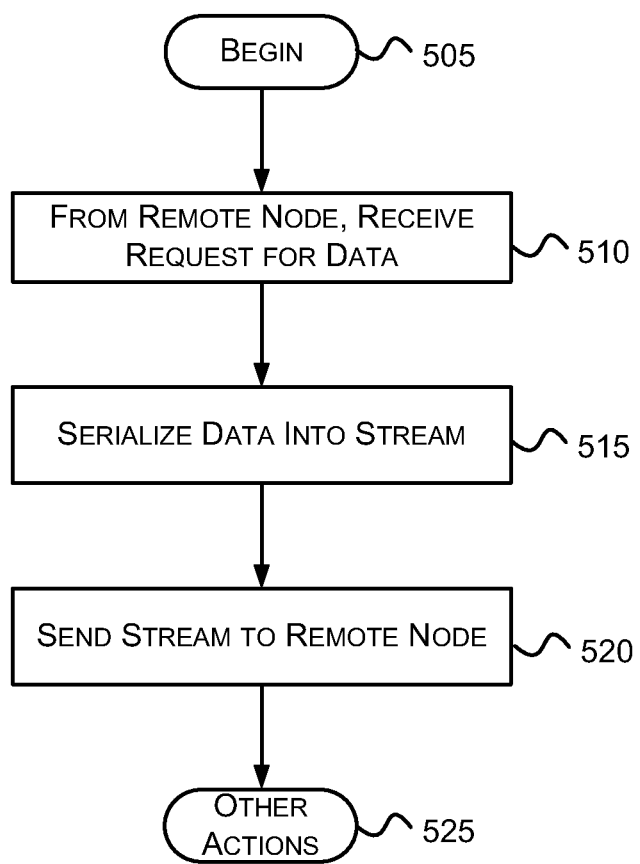
FIG. 5 is a flow diagram that generally represents exemplary actions that may occur on a node that is providing requested data in accordance with aspects of the subject matter described herein.

FIGS. 4-5 are flow diagrams that generally represent actions that may occur in accordance with aspects of the subject matter described herein. For simplicity of explanation, the methodology described in conjunction with FIGS. 4-5 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 4 is a flow diagram that generally represents exemplary actions that may occur on a node that is requesting data in accordance with aspects of the subject matter described herein. Turning to FIG. 4, at block 405, the actions begin. For example, referring to FIG. 2, the node 208 may request data associated with an activity of a workflow that is executing on the node 208.

At block 410, a request for data associated with a workflow is received. The request is received in conjunction with a logical handle that may either arrive with the request (e.g., be a part of the request) or arrive before or after the request. For example, referring to FIGS. 2 and 3, the distributed framework components 228 (e.g., the distributed framework components 310 of FIG. 3) may receive the request.

At block 415, the logical handle is used to access a registry to locate information that indicates a location of the requested data. For example, referring to FIG. 3, the data locator 315 may use the registry manager 320 and a received logical handle to local information in a registry that resides on the store 340. As mentioned previously, the registry associates the logical handle with information (e.g., one or more records) about a workflow. For example, if the registry comprises a table of a database, the logical handle may be used to locate one or more rows in the table that include information about where the requested data resides.

At block 420, a determination is made as to whether the requester is allowed to access the data. This determination may be made via information included in the registry, for example. For example, referring to FIG. 3, the security manager 325 may determine whether the requester is to be allowed access to the requested data.

At block 425, a determination is made as to whether the data is available locally or remotely. Whether the data is available "locally" or "remotely" is described in more detail in conjunction with FIG. 3. For example, referring to FIG. 2, if the node 208 is requesting the data and the data resides on the node 209, the data is available remotely.

At block 430, if the data is available remotely, the actions continue at block 435; otherwise, the actions continue at block 440. For example, referring to FIG. 2, if the node 208 is requesting the data and the data resides on the node 209, the actions continue at block 435.

At block 435, the data may be securely retrieved according to policies/tags, if any, associated with the data. For example, referring to FIG. 3, the data importer 335 may obtain the data from the remote source in accordance with polices or tags, if any, associated with the data.

At block 440, the data is provided to the requester. For example, referring to FIG. 2, the distributed framework components 228 provide the requested data to the process on node 208 that requested the data.

At block 445, other actions, if any, may be performed.

FIG. 5 is a flow diagram that generally represents exemplary actions that may occur on a node that is providing requested data in accordance with aspects of the subject matter described herein. At block 505, the actions begin.

At block 510, a request for data is received from a node. The data is associated with a workflow. The workflow is associated with a registry that includes records that have a logical handle field usable to locate workflow information about the data. The workflow information indicating whether the data is local or remote as previously indicated. The workflow information also indicating one or more nodes from which the data is obtainable. The workflow information includes security information usable to determine whether a requester is allowed to send the request and also usable to provide the data over a secure connection. For example, referring to FIG. 2, the node 209 may receive a request for data from the node 208.

At block 515, the data is serialized into a stream and sent to the requester. For example, referring to FIG. 2, the node 209 may serialize the requested data into a stream (e.g., a byte stream or otherwise).

At block 520, the stream is sent to the remote node. For example, referring to FIG. 2, the node 209 sends the stream to the node 208.

At block 525, other actions, if any, are performed.

As can be seen from the foregoing detailed description, aspects have been described related to distributed workflows. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented by a plurality of computers, each computer having a distributed framework element that can receive a given data handle and determine from a common registry which of the computers is storing workflow data that corresponds to the given data handle, the method comprising:

receiving, at a given one of the computers, a request for workflow data associated with a workflow, the request received in conjunction with a logical handle, the workflow comprising an executable workflow definition stored on the one or more of the computers, the workflow definition defining a graph of activities linked by flow of data therebetween wherein completion of a first activity of the workflow triggers execution of a second activity of the workflow linked to the first activity in the graph, the one or more computers configured to be capable of executing arbitrary workflows, the request having been generated by a process executing an activity of the workflow;

passing the logical handle to the distributed framework element of the given one of the computers, which in turn accesses the registry, the registry comprising records for tracking and managing respective workflow data of various arbitrary workflows including data of the workflow corresponding to the request, wherein each record comprises access information to control access to the corresponding workflow data and location information indicating an address of a computer where the corresponding workflow data is stored, the records thereby indicating which of the computers are storing which portions of workflow data of arbitrary workflows;

responsive to receiving the logical handle accessing a record in the registry that corresponds to the logical handle, using the access information in the accessed record to determine that the computer can access the workflow data corresponding to the request, and in response the distributed framework element of the given computer obtaining from the accessed record the address of the computer storing the portion of workflow data that corresponds to the logical handle, wherein the distributed framework element of the given computer provides the address to the given computer; and using the address to access the portion of the workflow data that corresponds to the logical handle, wherein the activity corresponding to the request executes using the accessed portion of the workflow data.

2. The method of claim 1, further comprising automatically distributing activities of the workflow based on factors including one or more of workflow needs, node capacities, user hints, policies, and rules.

3. The method of claim 1, wherein accessing the portion of workflow data comprises receiving a serialized representation of the portion of workflow data from the computer corresponding to the identified address, the serialized representation comprising a sequence of bits that includes one or more of program code, program state, or program data.

4. The method of claim 1, wherein accessing the portion of workflow data comprises applying a policy that indicates one or more rules for accessing the specified workflow data.

5. The method of claim 4, wherein the one or more rules indicate that when any data of a file is first requested from a remote computer, that all data of the file is to be obtained from the remote computer.

6. The method of claim 4, wherein the one or more rules indicate that the portion of workflow data is to be obtained prior to starting the activity from which the request originates.

7. The method of claim 1, further comprising using the logical handle to locate security information in the registry.

8. The method of claim 7, further comprising determining, via the security information, whether an entity making the request is allowed to access the portion of workflow data.

9. The method of claim 7, further comprising securely accessing the portion of workflow data via the security information.

10. The method of claim 1, further comprising using the logical handle to determine if the registry includes a tag regarding the portion of workflow data, and if so, accessing the portion of workflow data according to the tag, the tag indicating a user-defined rule for obtaining data.

11. In a computing environment, an apparatus comprising a plurality of nodes, wherein each node comprises:

a store that includes a registry, the registry comprising records for tracking and managing respective workflow data of various arbitrary workflows including data of the workflow corresponding to the request, wherein each record comprises access information to control access to the corresponding workflow data and location information indicating an address of a node where the corresponding workflow data is stored, the workflow having the portions of workflow data stored among the plurality of nodes, the registry records indicating which of the nodes are storing which of the portions of workflow data, the workflow comprising an executable workflow definition stored on the one or more nodes, the workflow definition defining a graph of activities linked by flow of data therebetween wherein completion of a first activity of the workflow triggers execution of a second activity of the workflow linked to the first activity in the graph, the one or more nodes configured to be capable of executing arbitrary workflows;

a registry manager providing access to the registry to facilitate execution of the workflow, the registry receiving requests indicating respective portions of the workflow data, the requests having been generated by processes to execute activities of the workflow, and the requested portions of workflow data to be used by the processes to execute the activities, wherein each request for a workflow data comprises a logical handle of the workflow data and the logical handle is used to access the corresponding registry record, wherein the access information of the accessed registry record is used to determine whether a computer that generated the request is permitted to access the corresponding workflow data;

a data locator accessing the registry information to determine, according to the registry manager, node locations of the requested portions of workflow data;

a data importer that uses the determined node locations to access the respective requested portions of workflow data from the node locations determined by the data locator.

12. The apparatus of claim 11, wherein the registry manager receives a logical handle and returns one or more records from the registry information based on the logical handle.

13. The apparatus of claim 12, wherein the one or more records include one or more of location data, version data, creation data, validation data, security data, policy data, one or more tags, provenance data, and one or more process identifiers associated with the logical handle.

14. The apparatus of claim 11, wherein the data importer is further operable to deserialize the data and construct a data structure from the data on a storage media of the apparatus after obtaining the data from a remote node.

15. The apparatus of claim 11, further comprising a security manager operable to access the registry information to obtain security information therefrom, the security manager further operable to enforce security with respect to the requested data in accordance with the security information.

16. The apparatus of claim 11, further comprising a data exporter operable to obtain one or more of executable code, program state, and other data related to a request for data, to serialize the one or more of executable code, program state, and other data into a byte stream, and to send the byte stream to a requesting entity.

17. A method for executing a workflow by a plurality of nodes, the workflow comprising a plurality of interrelated activities executed by the nodes, the method comprising:

executing the activities of the workflow on the nodes, the workflow having various portions of workflow data stored on various of the nodes;

executing a workflow framework element on each of the nodes, each workflow framework element able to receive arbitrary logical handles and determine from a data registry which of the nodes are storing which portions of workflow data corresponding to the logical handles, the data registry comprising records of respective workflow data, each record including an address of a node storing the corresponding workflow data and access information to control access to the corresponding workflow data;

when a given activity is executing on a given node, when execution of the given activity requires a given portion of the workflow data, determining that the given portion of the workflow data is not available on the given node and in response passing a given logical handle corresponding to the given portion of the workflow data to the workflow framework element on the given node, the workflow framework element of the given node responding by: accessing the record corresponding to the given portion of the workflow data, determining from the access information that the given node has permission to access the given portion of the workflow data to obtain the node address in the record, and providing the node address of a particular node to the given node; and accessing, by the given node using the provided node address, the given portion of workflow data from the particular node.

* * * * *